Figure 1:
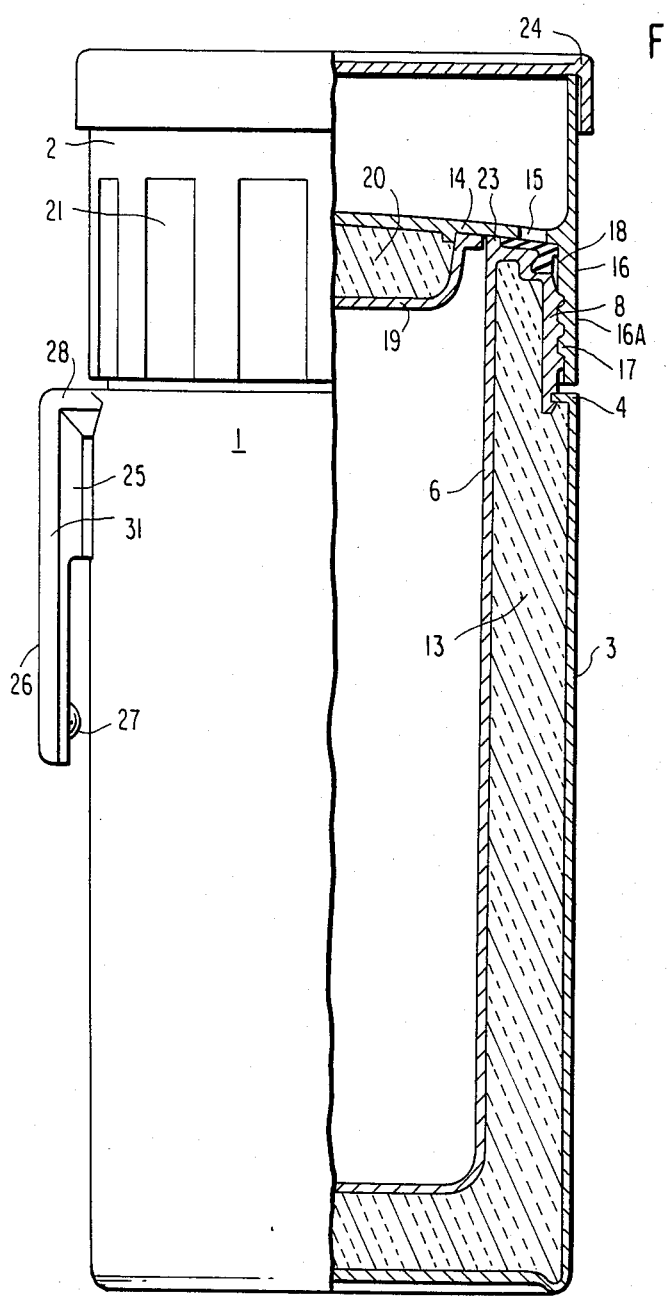

United States Patent [19]

De Freitas

[11] Patent Number: 4,489,840
[45] Date of Patent: Dec. 25, 1984

[54] ISOTHERMAL CONTAINER WITH A CUP-SHAPED TOP

[75] Inventor: Elias M. De Freitas, Porto Alegre, Brazil

[73] Assignee: Termolar S/A, Porto Alegre, Brazil

[21] Appl. No.: 519,801

[22] Filed: Aug. 3, 1983

[30] Foreign Application Priority Data

Aug. 10, 1982 [BR] Brazil .................................. 6201078

[51] Int. Cl.³ ............................................. B65D 47/06
[52] U.S. Cl. ................................. 215/13 R; 220/90.4; 222/520
[58] Field of Search .......................... 215/13 R, 13 A; 220/90.4; 222/520, 519, 549

[56] References Cited

U.S. PATENT DOCUMENTS

| | | | |
|---|---|---|---|
| 1,509,419 | 9/1924 | Colgate et al. | 222/520 |
| 3,096,897 | 7/1963 | Hansen | 215/13 R |
| 3,285,450 | 11/1966 | Piker | 215/13 R |
| 3,542,258 | 11/1970 | Marchant | 222/520 |
| 3,776,433 | 12/1973 | DeTreitas | 215/13 A X |

Primary Examiner—Donald F. Norton
Attorney, Agent, or Firm—Beveridge, DeGrandi & Kline

[57] ABSTRACT

An isothermal container with a cup-shaped top is disclosed which has an outer body (3), closed at its bottom part, and an inner container body (6) with the same general shape as the outer body (3), the upper edge (4) of the outer body is turned inwardly and fits into an annular groove (5) in the inner body. A thermal insulation of the plastic-foam type (13), fills the space between the two bodies. An annular ridge (23) is formed on the upper part of the inner body and is surrounded by a tapered surface (7) with a slight outward and downward slant, the external edge of which extends into a downwardly inverted tapered surface, slanted inwardly, and meeting a horizontal annular surface projecting outwardly to form a recess (10) therebetween. A depending casing portion (8) of this annular member is fitted with an external thread (9) and an annular groove (5) adjacent its bottom edge, which mates with a corresponding portion of the outside container wall. A sealing ring (11) rests on the tapered surface (7) and is fitted into the recess (10), showing a slight upward protrusion in relation to the ridge (23) and having an annular projection (12) laterally. The cup-shaped top (2) is cylindrical and open at its upper end, thereby forming a drinking lip. A circle of holes (15) near the inside bottom (14) periphery of the cup permits communication with the interior of the inner container and enables flow of liquid to the cup when the cup is loosened from right engagement with the threaded connection.

5 Claims, 3 Drawing Figures

U.S. Patent    Dec. 25, 1984    4,489,840

ISOTHERMAL CONTAINER WITH A CUP-SHAPED TOP

The present invention relates to an isothermal container of relatively small capacity, fitted with a cup-shaped top which performs the dual function of hermetic sealing, thus allowing the container to be carried in any position, and also allowing said top to operate when in the open position, as a cup from which one can drink, without the need of pouring the liquid from the isothermal container into a glass or cup.

Several thermos-cups models are known whose tops must be removed for the contents to be drunk.

Also known are containers such as the Thermos "Go-Cup", and the thermo-serv "Travel Tumbler", etc., whether or not insulated, equipped with valve-type devices which, once actuated, open up communication between the interior of the container and the top, the latter featuring a cup-shaped recess. Therefore, in order to use those containers, there is no need to remove their tops, but only to work the valve and incline the container, drinking directly from the edge of the cup-shaped top.

However, all of these existing solutions are characterized by a mechanical complexity, with devices constituted by valves, levers, return springs, etc., which, in addition to the problems of a dependable operation, are difficult to clean.

Furthermore, these valve-equipped mechanisms present a doubtful effectiveness as to the sealing of the container, whenever the same contains gaseous beverages, which generate internal pressure within the container.

In the case of the container which is the object of this invention, the mechanism features extreme simplicity and ease of cleaning with maximum effectiveness as to sealing, plus simplified manufacturing, which translates into a real progress in relation to the existing models.

Figure 2:
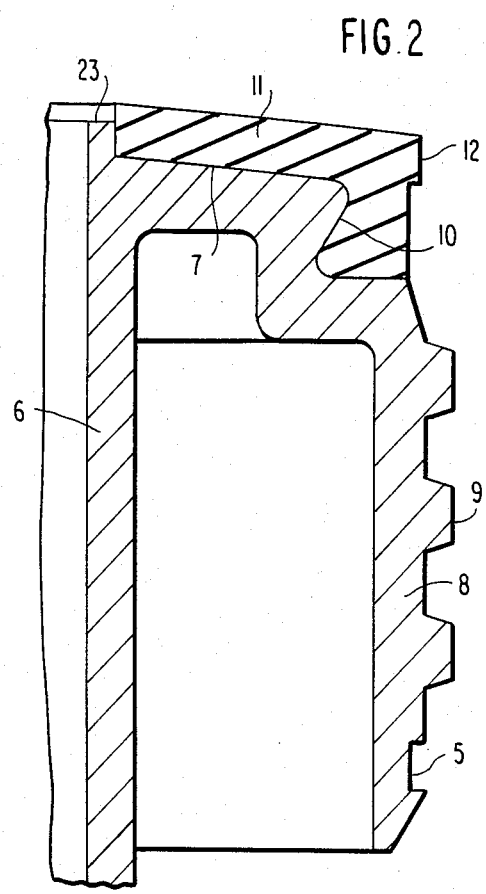
Figure 1A:
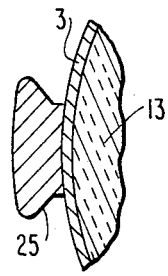
Figure 3:
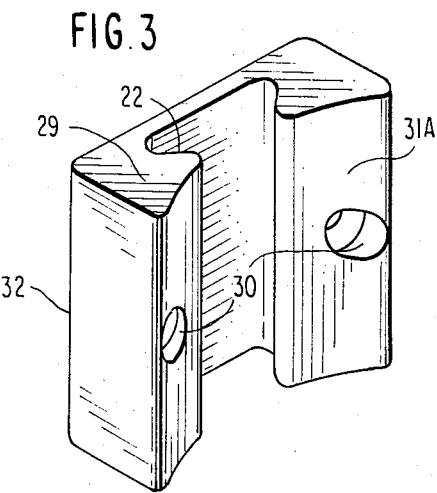

The invention will be further understood from the accompanying drawings, wherein FIG. 1 is a side elevational view in partial cross-section, FIG. 2 is a partial sectional view of sealing detail and closure thread, and FIG. 3 is a perspective view of the support.

In further detail, FIG. 1 shows the entire set of the invention including a thermally-insulated container (1), onto which is threaded a cup-shaped top (2), that can provide a hermetic seal or closure.

The container outer body (3) has a cylindrical or any other convenient shape, closed at its bottom part and featuring an upper edge (4) which is turned inwardly, fitting into an annular groove formed in the casing (8) of the inner container (6).

As shown in more detail in FIG. 2, the inner container (6) has the same general shape as the outer body (3) and is complementary thereto, and features an annular ridge (23) extending from its inner wall. Externally to this ridge (23) there is a tapered surface (7) surrounding the annular ridge (23), with a slight outward and downward slope, displaying in its outer edge an inwardly-slanted, downwardly-inverted tapered surface, followed by an essentially horizontal, annular surface which proceeds outwardly, thus forming the recess or housing (10). Next to this recess (10) follows a casing (8) provided with an external thread (9) and an annular groove (5) at its lower edge.

Centered by the annular ridge (23), resting onto the surface (7) and fitted into the recess (10) is the sealing ring (11), made of an elastomer, slightly protruding in relation to the ridge (23) and featuring an annular lateral projection (12).

The space between the inner (6) and outer (3) walls of the container is packed with a thermal insulator material, preferably of the plastic-foam type (13).

The cup-shaped top (2) is cylindrical, open at its upper part, thus forming a drinking lip, with its bottom (14) having, next to the periphery, a circle of holes (15) and a casing (16) projecting downwards, with an inner thread (17) which fits onto the container's external thread (9).

When the top is tightened, the sealing ring (11) obstructs the crown of holes (15) at the bottom (14) of the cup-shaped top, thus rendering the container perfectly hermetically sealed. On loosening the cup-shaped top with a slight turning motion, its bottom (14) rises in relation to the top of the sealing ring (11), thus clearing the holes (15), and allowing the liquid within the container (6) to start flowing freely up to the bottom of the cup-shaped top (2), when the whole set is tilted to the regular drinking position.

Any leakage of liquid through the threads (9) and (17) is prevented by the annular projection (12) of the sealing ring (11), which presses onto and slides along the smooth projection of the inner wall (18) of the depending skirt portion (16A), whose diameter is slightly smaller than that of the thread (17) of the cylindrical casing (16) of the cup-shaped top (2).

As the bottom (14) of the cup-shaped top (2) a calotte-shaped member (19) is soldered underneath, containing insulating material (20), in order to reduce the heat exchange between the container interior and the atmosphere.

For the cleaning and filling of the container the cup-shaped top (2) is removed entirely. Since the container is smooth and has no dirt-collecting recesses, it is very easy to clean. The mouth is sufficiently wide to permit the introduction of ice cubes as well.

Due to the good sealing provided by the ring (11) this container fitted with a cup-shaped top (2) can be used with gaseous beverages, such as carbonated drinks, at no risk of leakage.

The cup-shaped top (2) can be added by a cover-top (24), which is secured simply by friction (pressure), with the purpose of protecting the cup against dust, etc.

The cup-shaped top (2) may have, on its external wall (16), texturized non-skid rectangular areas (21) which provide a better grip when turning.

Soldered to the upper part of the lateral surface of the outer body (3) there is a projection (31) of rectangular shape, whose upper part (25) is connected with the outer body (3) and has a dovetail cross-section, extending downwards with a small tongue (26), also dovetailed, and fitted internally with a small hump (27) near its lower end.

On the upper part of the projection (31) there is a stop (28) to limit its entry into the support (29). The support (29) as shown in FIG. 3 is a rectangular block with a concave, curved anterior face (31A), which will conform to the cylindrical outer body (3) of the container (1). This face (31A) is open along its vertical axis by a dovetail slot (22) wherein is fitted the small tongue (26) of the container (1) projection (31). The rear face (32) of the support (29) is a flat surface.

On the curved face (31A) there are two countersunk holes (30) through which are driven the screws for wall-mounting of the support (29) in cars, boats, trailers and vehicles in general, thus cradling the container with a cup-shaped top into the support (29), by means of its tongue (26), said container becoming easily accessible by the users.

This perfect fit allows a one-hand turning (rotation) of the top (2) for subsequent use of the cup.

The aforementioned small tongue (26) can also be used to hook up the cup directly to the user's belt (canteen-style), as in the case of cyclists, hunters, etc., and the cup will not fall off because of the small hump (27).

It is therefore a feature of the invention to provide an isothermal container with a cup-shaped top comprising an outer body (3) closed at its bottom part and having an upper edge (4) turned inwardly, said upper edge (4) fitting into the annular groove (5); and an inner container body (6) with the same shape as the outer body (3), between which there is a thermal insulation, said inner container having an annular ridge (23) on its upper part surrounded by a tapered surface (7) with a slight outward and downward slant, the external edge of which extends into a downwardly inverted tapered surface, slanted inwardly, and followed by a horizontal annular surface projecting outwardly, thereby forming a recess (10), said horizontal annular surface having a depending casing portion (8) which is fitted with an external thread (9) and an annular groove (5) adjacent to its bottom edge; a sealing ring (11) resting on the surface (7) and fitted into the recess (10), and having a slight upward protrusion in relation to the ridge (23) and having an annular projection (12) laterally.

A further feature of the invention resides in an isothermal container with a cup-shaped top wherein the cup-shaped top (2) is typically cylindrical and open at its upper end, forming a drinking lip, with a circle of holes (15) near the inside bottom (14) periphery, thereby communicating with the interior of the inside container to permit the flow of liquid from the container to the cup when the cup is loosened from tight engagement of the threaded connection.

I claim:

1. An isothermal container with a cup-shaped top comprising an outer body (3) and an inner container (6) fitted into said outer body (3), said inner container having an upper surface part, said outer body being closed at its bottom and having an upper edge (4) turned inwardly and fitting into an annular groove (5) formed in the inner container; there being thermal insulation between the inner container and the outer body, the inner container having an annular ridge (23) on its upper surface part surrounded by a tapered top surface (7) being a slight outward and downward slant thereby forming a projecting leading circumferential edge thereof extending into a downwardly and inwardly tapered surface, and forming a horizontal annular surface projecting outwardly, forming a recess (10), wherefrom a casing (8) depends which is fitted with an external thread (9) the cup-shaped top being threaded onto the external thread (9) a sealing ring (11) resting on said tapered top surface (7) and fitted into the recess (10), and extending above the ridge (23) and further having an annular projection (12) at its top surface.

2. An isothermal container according to claim 1 further comprising a cup-shaped top (2), cylindrical in shape and open at its upper end, forming a drinking lip, with a circle of holes (15) near its bottom (14) periphery.

3. An isothermal container according to claim 2 further comprising said cup-shaped top having a cup portion with a bottom (14) and a depending portion (16) projecting downwardly from the periphery, which depending portion is fitted with an internal thread (18) said cup-shaped top having an interior area defined by said depending portion and the bottom surface (14) of the cup said interior area having an upper portion, said upper portion having insulating means fitted therein and a covertop (24) fitted onto the cup portion.

4. An isothermal container according to claim 1 which further comprises mounting means including a lateral projection (31) on the outer body (3) with a dovetail cross-section (25), and depending therefrom, a tongue shaped segment (26) having an inner surface, also dovetailed, provided in its inner face with a small hump (27) near one end of the segment, and fitted with a stop (28) on the upper part of the projection (31).

5. An isothermal container according to claim 4 in combination with means for fastening of the container to an upright surface or wall, said means for fastening comprising a rectangular block support (29), with a concave curved anterior face (31A), provided with at least one hole (30) for a fastening screw and open at the center, with a dovetail slot (22) through which is fitted the tongue shaped segment (26) of the lateral projection (31) of the container (1).

* * * * *